(12) United States Patent
Denoff (10) Patent No.: US 7,367,876 B1
(45) Date of Patent: May 6, 2008

(54) SHELLFISH TOOL

(76) Inventor: Dennis R. Denoff, 1375 Fishhawk Ct., Mason, OH (US) 45040

( * ) Notice: Subject to any disclaimer, the term of this patent is extended or adjusted under 35 U.S.C. 154(b) by 0 days.

(21) Appl. No.: 11/598,264

(22) Filed: Nov. 13, 2006

(51) Int. Cl.
*A22C 29/02* (2006.01)

(52) U.S. Cl. ........................................................ 452/2

(58) Field of Classification Search ................ 452/1–6, 452/12, 13, 17, 102–105; 30/111–113, 120.1–120.5, 30/286, 287, 289, 294, 295, 299, 314, 317, 30/340, 353, 356, 357, 308.1, 318; 7/129–135; 81/9.4, 9.44, 418, 420
See application file for complete search history.

(56) References Cited

U.S. PATENT DOCUMENTS

| | | | | |
|---|---|---|---|---|
| 851,245 | A | * 4/1907 | Myer | 83/679 |
| 1,065,863 | A | * 6/1913 | Carter | 30/155 |
| 1,553,449 | A | * 9/1925 | Kennedy | 30/294 |
| 1,843,223 | A | 2/1932 | Hasseler | 30/353 |
| 2,039,850 | A | 5/1936 | Silaj | 452/3 |
| 2,471,334 | A | * 5/1949 | Levin | 30/287 |
| 2,810,194 | A | * 10/1957 | Unsinger | 30/321 |
| 2,822,845 | A | 2/1958 | Medlin | 83/574 |
| 3,365,798 | A | * 1/1968 | Cunningham | 30/287 |
| 3,583,024 | A | * 6/1971 | Garza | 452/120 |
| 3,609,800 | A | 10/1971 | Rollband | 452/6 |
| 3,972,117 | A | * 8/1976 | Fogg | 30/287 |
| 4,048,696 | A | 9/1977 | Maschio | 452/5 |
| 4,172,306 | A | 10/1979 | Hopkins | 452/6 |
| 4,200,961 | A | 5/1980 | Mueller | 452/6 |
| 4,519,136 | A | 5/1985 | Walker | 30/142 |
| 4,569,103 | A | 2/1986 | Taurinskas | 452/6 |
| 4,610,052 | A | 9/1986 | Lubcke | 452/6 |
| 4,759,126 | A | 7/1988 | McCoy et al. | 30/120.1 |
| 5,080,629 | A | 1/1992 | Ellison | 452/6 |
| 5,403,230 | A | 4/1995 | Capriglione, Sr. | 452/6 |
| 5,586,931 | A | 12/1996 | Williams, Jr. | 452/6 |
| 5,613,904 | A | 3/1997 | LaSalle et al. | 452/6 |
| 5,829,321 | A | * 11/1998 | Domenico | 76/104.1 |
| 6,503,137 | B2 | * 1/2003 | Maille | 452/17 |
| D521,844 | S | * 5/2006 | Kempker et al. | D8/98 |
| 7,121,939 | B1 | * 10/2006 | Quaglino | 452/6 |

\* cited by examiner

*Primary Examiner*—Thomas Price
(74) *Attorney, Agent, or Firm*—Alfred J. Mangels (57) ABSTRACT

A cutting tool for cutting the outer shells of shellfish such as crabs, shrimp, and the like. The tool includes an elongated handle and one or more longitudinally-outwardly-extending ends that include V-shaped openings. The openings include inner, angularly-opposed cutting edges, and the bisector of the angle defined by the cutting edges extends in a generally perpendicular direction relative to the handle longitudinal axis.

21 Claims, 6 Drawing Sheets

SHELLFISH TOOL

BACKGROUND OF THE INVENTION

1. Field of the Invention

The present invention relates to a hand-held tool for easily cutting the shells of shellfish, such as crabs, shrimp, lobsters and the like, to more quickly and conveniently access the shellfish meat and remove it from the shell. More particularly, the present invention relates to a hand-held tool that has a shell cutter that includes at least one V-shaped cutting edge for cutting along and through a shellfish shell, and a bulbous, rounded end to assist in the removal of the shellfish meat from the shell after the shell has been cut open.

2. Description of the Related Art

Shellfish meat has been and continues to be a very popular food item. However, unless the shellfish meat happens to have been removed from the shell and either packaged or served after removal from the shell, one must himself remove the meat from the shell by slicing open the shell in order to access the meat to allow it to be removed for consumption.

Typically, shellfish, including crustaceans such as crabs and lobsters, which each have relatively tough outer shells, are sold in restaurants or for home consumption with the meat within the shell. Consequently, after cooking, the shell must be cut open using a suitable cutting device in order to access the meat. And although different forms of shell cutting devices have been proposed in the past for accessing shellfish meat, they have drawbacks that render their use inconvenient or problematical. For example, many previously-proposed shellfish cutting devices had one or more pointed ends that rendered their use potentially dangerous, and that also limited portability of the cutting devices in that they could be not be conveniently carried in one's pocket without making a hole in the pocket or sticking the wearer. The presence of pointed ends made attempts to carry such devices in one's pocket unsafe. In addition to the pointed ends, the previously-proposed devices also were generally large or lengthy, which also contributed to the unlikelihood of their being conveniently carried in one's pocket.

Furthermore, and in addition to the safety aspect, many of the previously proposed devices were not designed in such a way as to aid in conveniently removing the meat from the shell after the shell had been sliced open. Accordingly, the use of the previously-proposed devices was inconvenient, both from a cutting standpoint as well as from a meat removal standpoint.

It is an object of the present invention to overcome the deficiencies inherent in the previously-proposed devices, and to provide a shellfish shell cutting and meat removal tool that is both quick and easy to use to cut a shell, that is safe to use and carry without a case or cover, and that also facilitates the removal of the shellfish meat once the shell has been cut.

SUMMARY OF THE INVENTION

Briefly stated, in accordance with one aspect of the present invention, a shellfish tool is provided for cutting a shellfish shell and for removing shellfish meat from the shell. The tool includes an elongated body member having a longitudinal axis and defining a handle, to enable convenient gripping and holding of the tool in the hand of a user. A first, hook-shaped end member is adjacent a longitudinal end of the body member, the end member including a generally V-shaped opening having a generally V-shaped cutting surface that is defined by a pair of recessed, angularly-opposed cutting edges. The V-shaped opening is adapted to engage an edge portion of a shellfish shell, and the angularly-opposed cutting edges are disposed at a first acute angle relative to each other, and are disposed relative to the handle so that a bisector of the first acute angle extends in a substantially perpendicular direction relative to the body member longitudinal axis.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
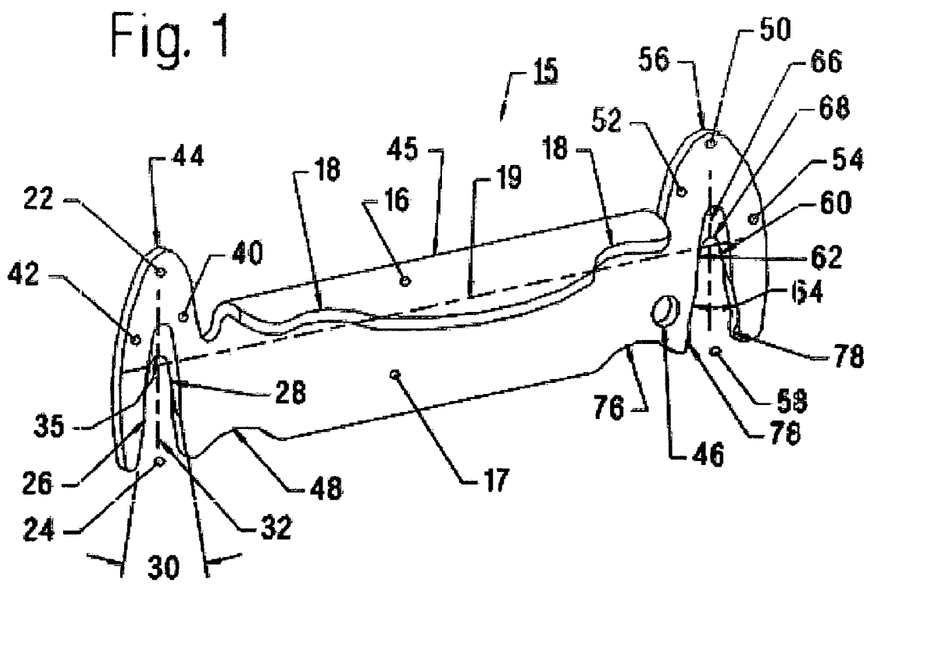
FIG. 1 is a front perspective view of an embodiment of a shellfish cutting and meat removal tool in accordance with the present invention.
Figure 2:
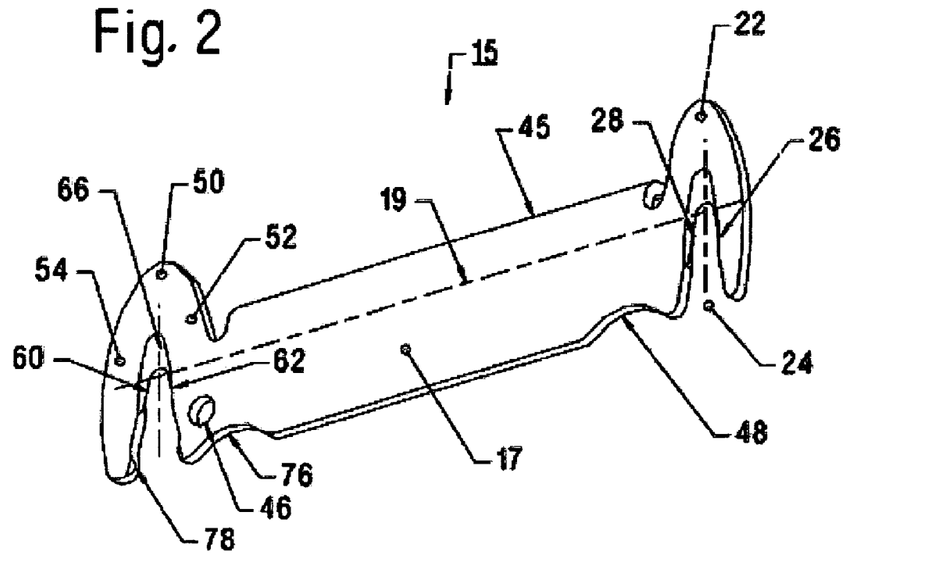
FIG. 2 is a rear perspective view of the tool shown in FIG. 1.

Referring now to the drawings, and particularly to FIGS. 1 and 2 thereof, there is shown a hand-held shellfish tool 15 with a body member defined by an elongated central handle 17 that extends in a longitudinal direction along longitudinal axis 19. Handle 17 as shown is a planar element having front and back faces and is adapted to be gripped by a user wrapping his fingers around the handle. A flange 16 that can extend longitudinally and outwardly from either of the front or back faces of handle 17 can be provided for additional gripping surface, to facilitate holding of the tool in a user's hand. Flange 16 can be inclined relative to handle 17 at an acute included angle, for example from about 40° to about 100°, preferably about 77°, to provide a rounded edge that rests comfortably against the inner surfaces of a user's fingers when the tool is held for use. Additionally, flange 16 can include outer, index-finger-receiving edge recesses 18, only two of which are shown in FIG. 1, for either right- or left-handed users, although additional outer edge recesses can also be provided if desired. Optionally, instead of providing flange 16 for gripping purposes, handle 17 can be encased within a surrounding plastic or wood body to provide additional gripping surface area for additional holding comfort. Further, handle 17 can include an opening 46 for attaching the tool to a key ring or for hanging the tool on a hook or a peg.

Tool 15 can be economically formed as a stamping from a metallic sheet having a thickness of the order of from about 1 mm to about 2 mm or so. The metal can suitably be a non-rusting, food grade metal, such as 304L stainless steel, or the like. Alternatively, tool 15 can be die cut from a sheet of tough plastic material, such as acrylic or polycarbonate, or it can be injection molded from those materials.

At a first end 22 of tool 15 there is provided a first V-shaped opening 24. The sides of opening 24 are defined by a pair of opposed, substantially linear cutting edges 26, 28 that are disposed at an acute included angle 30 relative to each other to diverge from each other in an outward direction of opening 24. Angle 30 can range from about 8° to about 40°, preferably from about 18° to about 24°, and most preferably it is about 21°. Cutting edges 26, 28 terminate inwardly of the wider outer end of opening 24, at a distance from the outer end of the opening of from about 3 mm to about 100 mm. Opening 24 is arranged so that the bisector 32 of angle 30 is approximately perpendicular to longitudinal axis 19 of handle 17. Additionally, the vertex or innermost end 35 of opening 24 is rounded and has a radius of curvature of from about 0.8 mm to about 3.0 mm, preferably about 1.6 mm.

Figure 5:
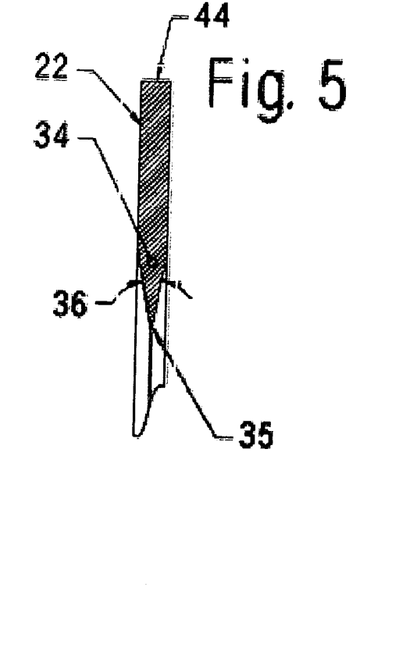
FIG. 5 is a cross-sectional view taken along the line 32 of FIG. 3.
Figure 6:
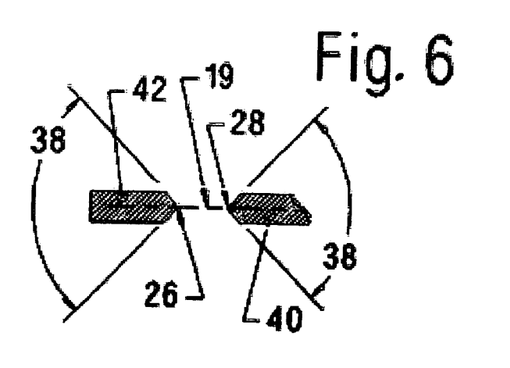
FIG. 6 is a cross-sectional view taken along the line 19 of FIG. 3.

Innermost end 35 of opening 46 and cutting edges 26, 28 are shown in cross section in FIGS. 5 and 6, respectively. Cutting edge 35 at innermost end 35, which provides the major portion of the shell cutting surface when the tool is in use, is shown in FIG. 5 and is defined by an included cutting edge angle 36 of from about 7° to about 37°, preferably about 22°. The included cutting edge angle 38 along each of edges 26, 28, shown in FIG. 6, is from about 10° to about 32°, preferably about 22°.

First end 22 of tool 15 has a curved, generally U-shaped peripheral surface and is integral with handle 17. It includes an inner leg 40 and an outer leg 42, the outermost end of each of which is rounded to avoid sharp corners. The outermost peripheral surface 44 of first end 22, which is spaced outwardly along bisector 32 from vertex or innermost end 35, can be a circular arc having a radius of from about 2 mm to about 5 mm, preferably about 3 mm. Alternatively, outermost peripheral surface 44 of first end 22 can be in the form of an asymmetrical parabolic curve, or the like, having an end radius of about 10 mm. In either event, outermost peripheral surface 44 extends laterally outwardly beyond upper edge 45 of handle 17 (see FIG. 1), so that its most laterally distant point is spaced from upper edge 45 by a distance of from about 4 mm to about 15 mm, preferably about 9 mm, for assisting in removing the shellfish meat from the shell, as will be explained hereinafter.

Figure 3:
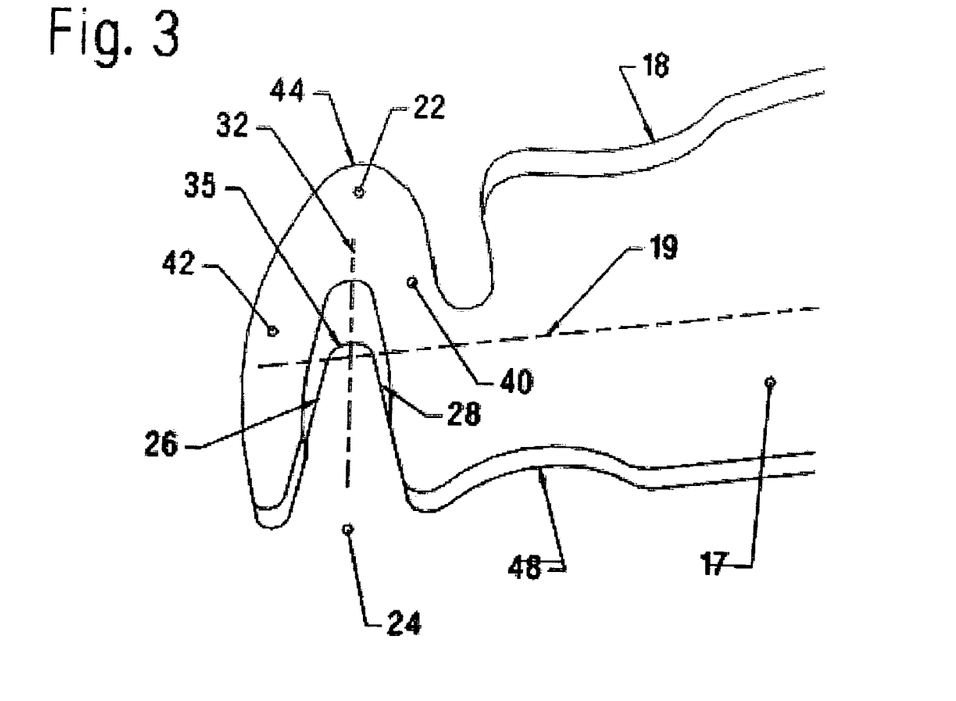
FIG. 3 is an enlarged, fragmentary perspective view of a first end of the tool shown in FIGS. 1 and 2.
Figure 4:
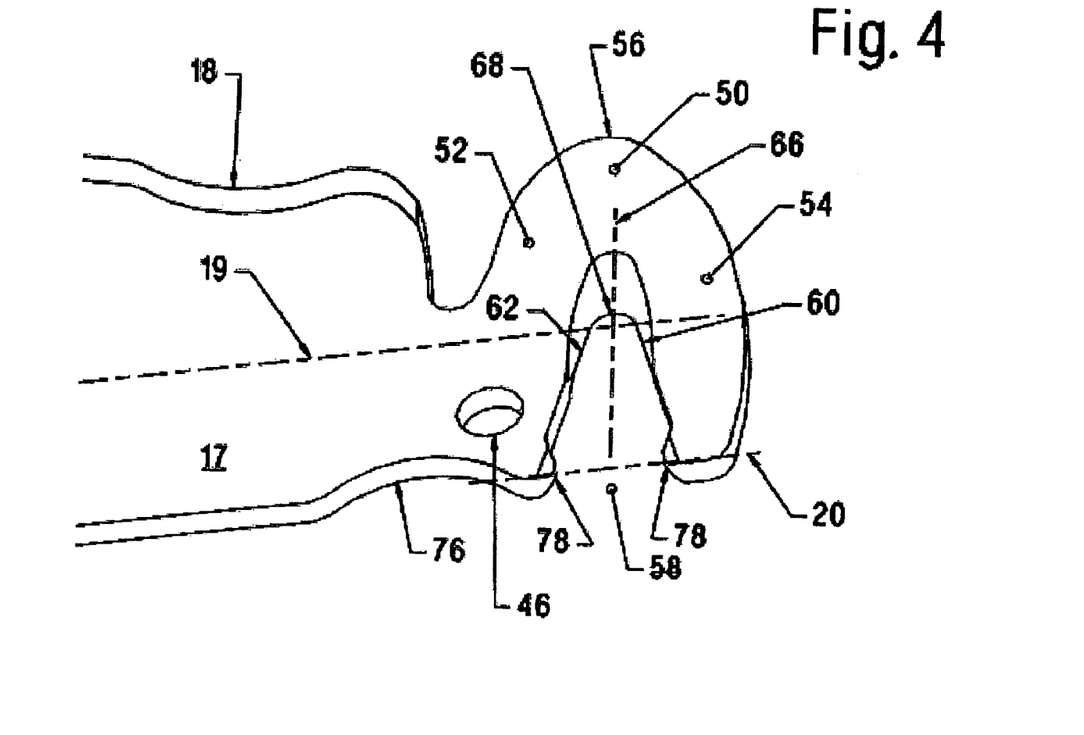
FIG. 4 is an enlarged, fragmentary perspective view of a second end of the tool shown in FIGS. 1 and 2.

As best seen in FIGS. 1 and 3, adjacent first end 22 and positioned on the bottom edge of handle 17 is a concavely-curved depression or recess 48. The purpose of recess 48 is to provide a thumb rest for the convenience of the user when the tool is in use.

In addition to first end 22, tool 15 can be provided with a similarly-shaped second end 50 that is provided at the opposite end of handle 17 from first end 22. Second end 50 of tool 15 is also a curved, generally U-shaped element that is integral with handle 17. It includes an inner leg 52 and an outer leg 54. The outermost peripheral surface 56 of second end 50 can be a circular arc having a radius of from about 3 mm to about 9 mm, preferably about 6 mm. Alternatively, outermost peripheral surface 56 of second end 50 can be in the form of an asymmetrical parabolic curve, or the like, having an end radius of about 4 mm. In either event outermost peripheral surface 56 extends laterally outwardly beyond upper edge 45 of handle 17, so that its most laterally distant point is spaced from upper edge 45 by a distance of from about 4 mm to about 15 mm, preferably about 9 mm, for assisting in removing the shellfish meat from the shell, as will be explained hereinafter.

At second end 50 of tool 15 there is provided a second V-shaped opening 58. The sides of opening 58 are defined by a pair of opposed, substantially linear cutting edges 60, 62 that are disposed at an acute included angle 64 relative to each other, to diverge from each other in an outward direction of opening 58. Angle 64 can range from about 9° to about 49°, preferably from about 24° to about 34°, and most preferably it is about 29°. Cutting edges 60, 62 terminate inwardly of the wider outer end of opening 58 at a distance from the outer end of the opening of from about 3 mm to about 10 mm. Opening 58 is arranged so that the bisector 66 of angle 64 is approximately perpendicular to longitudinal axis 19 of handle 17. Additionally, the vertex or innermost end 68 of opening 58 is rounded and has a radius of curvature of from about 0.5 mm to about 5 mm, preferably about 2 mm.

Figure 7:
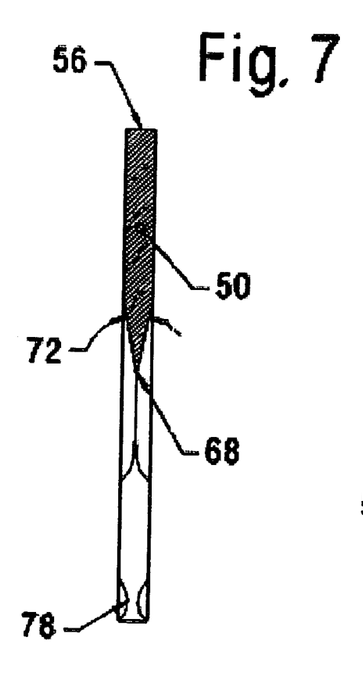
FIG. 7 is a cross-sectional view taken along the line 66 of FIG. 4.
Figure 8:
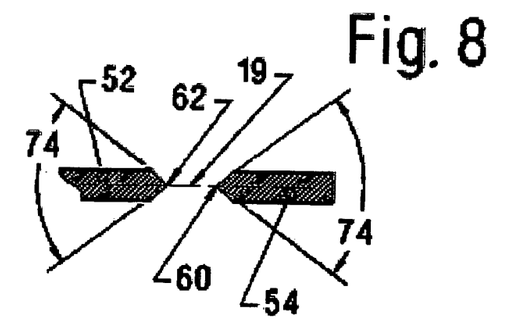
FIG. 8 is a cross-sectional view taken along the line 19 of FIG. 4.

Cutting edge 68 at innermost end 68, which provides the major portion of the shell cutting surface when the tool is in use, is shown in FIG. 7 and is defined by an included cutting edge angle 72 of from about 7° to about 37°, preferably about 22°. Cutting edges 60, 62 are shown in cross section in FIG. 8. The included angle 74 along each of edges 60, 62, shown in FIG. 8, is from about 10° to about 32°, preferably about 22°.

As best seen in FIGS. 1 and 3, adjacent second end 50 and positioned on the bottom edge of handle 17 is a recess 76. The purpose of recess 76 is similar to that of recess 48 to provide a thumb rest for the convenience of the user when the tool is in use.

Figure 9:
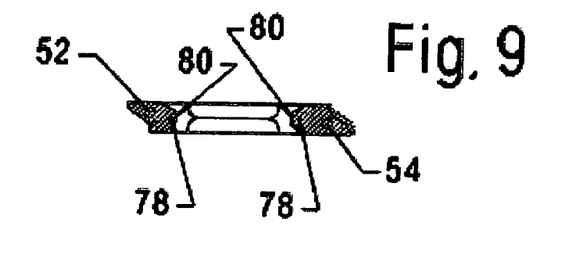
FIG. 9 is a cross-sectional view taken along the line 20 of FIG. 4.

Within V-shaped opening 58 of second end 50 are a pair of opposed, inwardly-extending projections or cracking nibs 78, for cracking a tough shellfish shell when necessary to facilitate access to the shellfish meat. Each of nibs 78 is inward of and adjacent to the open end of opening 58, and each nib extends inwardly relative to the inner surface of opening 58 at a distance of from about 0.5 mm to about 7 mm and has an included angle of from about 10° to about 50°. Additionally, as best seen in FIG. 9, each of nibs 78 has a tapered cross section, and each nib can have either a flat or a rounded innermost surface 80 that is narrower than the thickness of handle 17. However, innermost surface 80 is not a sharp, cutting edge, such as cutting edges 60. 62. Although two such nibs are shown, if desired only a single nib can be provided, such as on inner leg 52.

Figure 10:
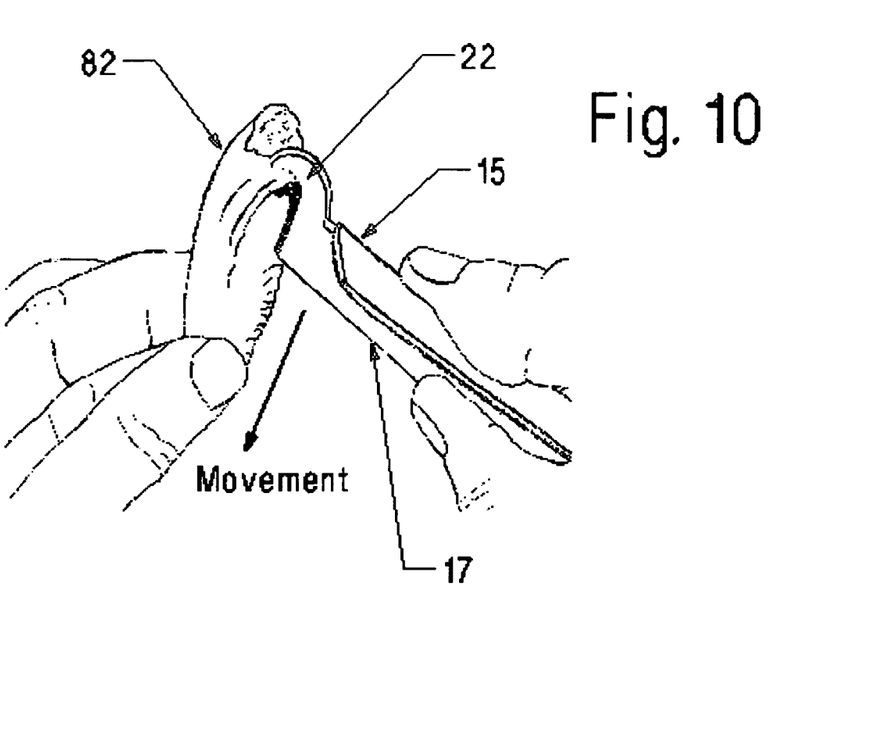
FIGS. 10 through 12 show several steps of the method of cutting a crab leg shell using a tool in accordance with the present invention, such as that shown in FIGS. 1 and 2.
Figure 11:
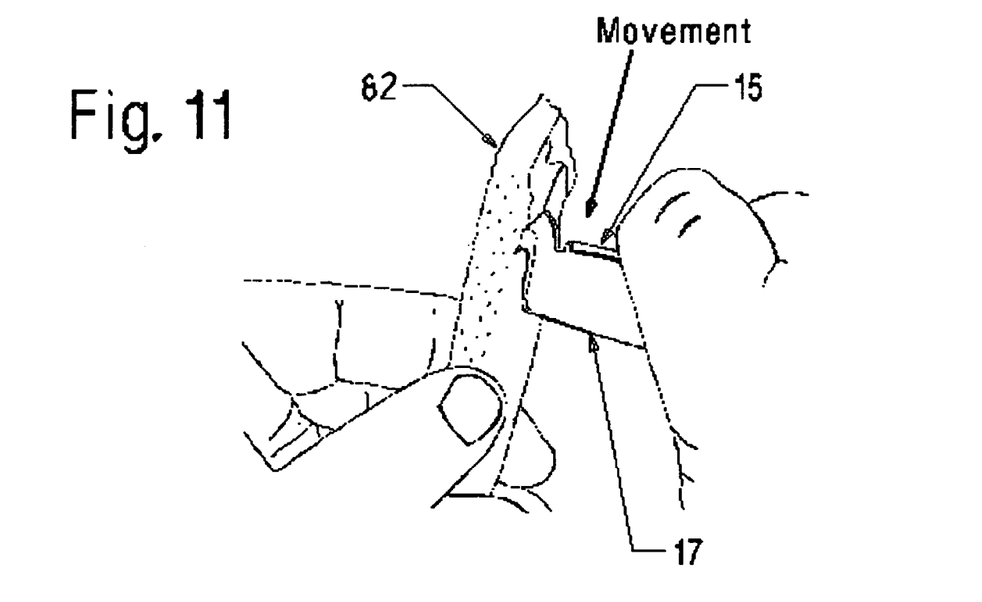
Figure 12:
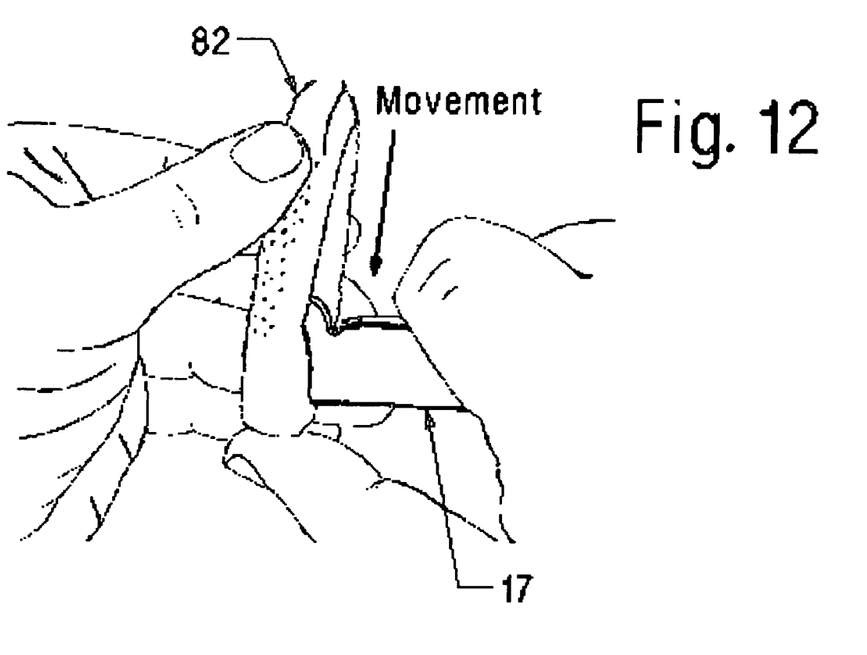

In operation, and referring to FIGS. 10 through 14, tool 15 can be gripped between the fingers, as shown, or with the user's fingers wrapped at least partially around handle 17, and with either first end 22 or second end 50 of tool 15 extending beyond the user's hand. A crab leg section 82, as shown in FIGS. 10 through 14, can be broken off from a crab leg at a joint to thereby expose end openings at each side of the joint to allow entry of an end of the tool into an end opening. The V-shaped opening of, for example, first end 22 of the tool is placed over an edge of the outer shell portion of leg section 82 at an open end thereof, as shown in FIG. 10, so that innermost edge 36 of V-shaped opening 24 is in contact with the edge of the shell. While holding the leg section in one's other hand, tool 15 is drawn lengthwise along the leg section, beginning at the open end, to cut through the shell, as shown progressively in FIGS. 11 and 12. That process can be repeated on the opposite side of the leg section, at a point approximately 180° from the first cut, to allow convenient separation of one cut portion of the shell from the other. At that point the crab meat is exposed and can readily be removed from the shell.

Figure 13:
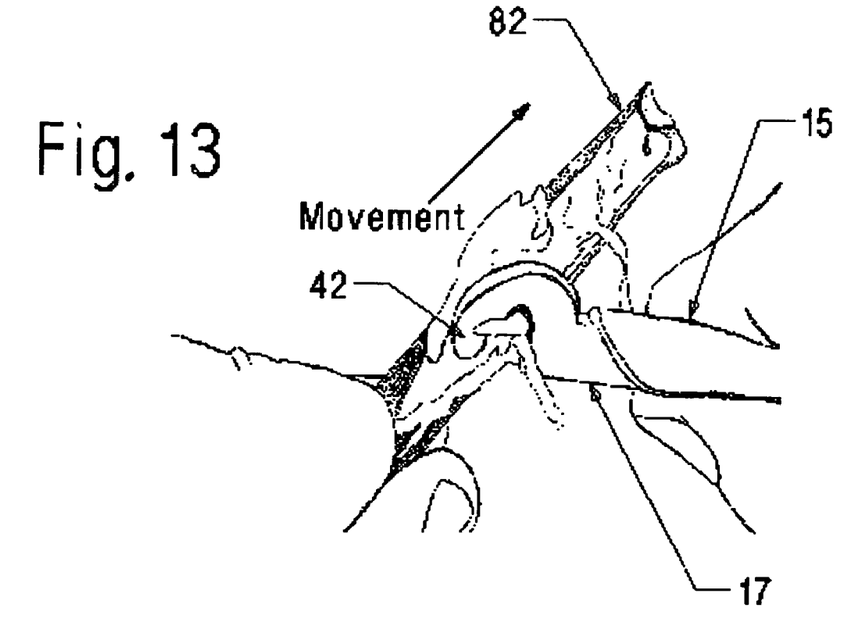
FIGS. 13 and 14 show the removal of crabmeat from a crab leg shell that has been sliced open using a tool of the type shown in FIGS. 1 and 2.
Figure 14:
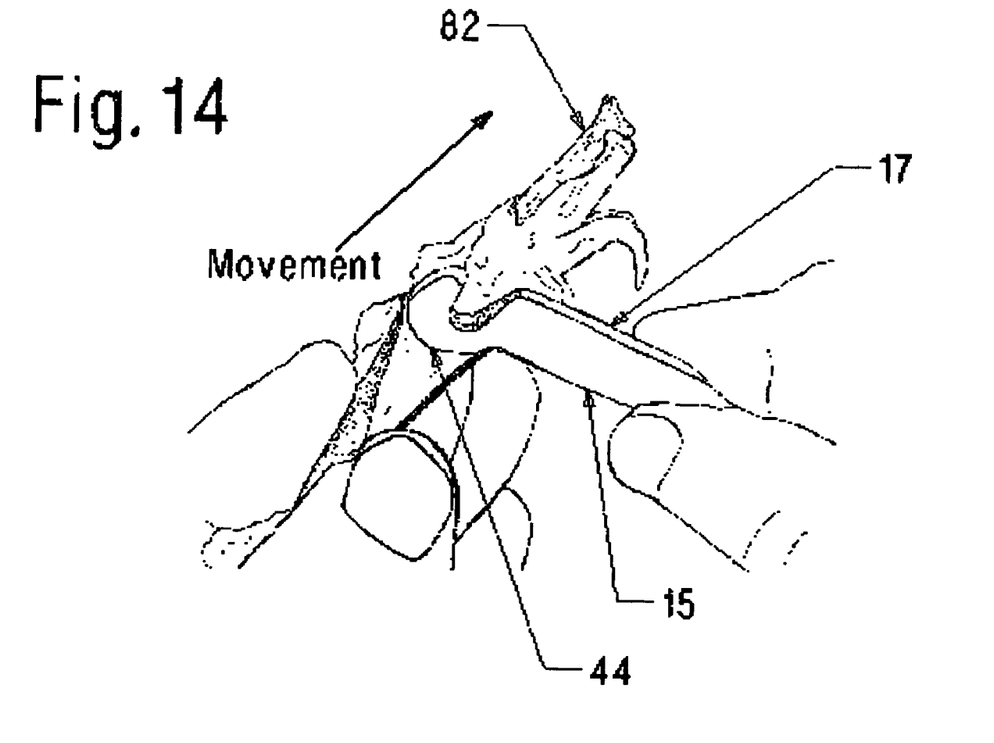

After the shell has been cut and the meat has been exposed, it can be pushed from the shell using first end 22 in the manner shown in either of FIG. 13 or 14. In FIG. 13, outer leg 42 of first end 22 is placed crosswise at one end of the open shell and is then moved lengthwise along the shell portion to push the meat along and out of the shell. Alternatively, and as shown in FIG. 14, the rounded outer peripheral surface 44 of first end 22 can be employed for that same purpose, and is particularly suitable when the open shell portion has a width that is larger than that of outer leg 42.

In the event a particularly thick or tough shell is encountered, the larger, second outer end 50 can advantageously be employed. In that regard, the tool is initially inserted into the leg or shell portion in the same manner as is shown in FIG. 10. Then, by employing a rocking motion in the plane of second outer end 50, nibs 78 can be pushed against the inner and outer surfaces of the shell in lever-like movements, which serve either to crack the shell or serve as a fulcrum about which cutting edges 60, 62 pivot back and forth through the shell to provide the cutting action. That process can be repeated as the tool is moved lengthwise along the leg or shell that is being cut, to enable even thick or tough shells to be easily cut using the tool herein described.

A similar technique can be used to cut the shell of a shrimp. In that regard, after removal of the head of the shrimp to expose an open end of the shrimp shell, an end of the tool is inserted into the open end in the same manner as described in connection with crab legs and as shown in FIG. 10. Because shrimps have a arc-shape, the tool is inserted so that the cutting edge is at the back of the shrimp, and the tool is drawn along the back of the shrimp, along the vein, to cut the shell. The vein is either pushed out or can be readily removed. The cut edges of the shell can then be spread apart to open the shell and allow removal of the meat.

It will be appreciated that the present invention greatly simplifies the opening of shellfish shells and the extraction of the shellfish meat, which adds to the enjoyment of eating crabmeat and other shellfish meat. It also provides a cutting tool that is safe to carry and to use in that it has smooth, rounded outer edges, with no exposed sharp edges and no outwardly-facing cutting edges that could injure a user. All cutting edges are recessed within the tool periphery for improved safety. Furthermore, the hooked ends of the tool that extend over the shell during the cutting process serve to guide the tool so that it does not slip from the shell as it is being cut.

Although particular embodiments of the present invention have been illustrated and described, it will be apparent to those skilled in the art that various changes and modifications can be made without departing from the spirit of the present invention. For example, although the tool handle portion and end members are shown as lying in the same plane, the end members could be angled relative to the handle portion if desired. Additionally, although shown as a one piece structure, the tool can also be formed as a molded plastic handle, or wooden handle, that includes spaced metallic end members that extend from opposite ends of the handle. Further, the tool could be made from a tough plastic material, if desired. Accordingly, it is intended to encompass within the appended claims all such changes and modifications that fall within the scope of the present invention.

What is claimed is:

1. A shellfish tool for cutting a shellfish shell and for removing shellfish meat from the shell, said tool comprising:
an elongated body member having a longitudinal axis and defining a handle to enable gripping and holding of the tool by a user; and
a first, hook-shaped end member adjacent a longitudinal end of the body member, the end member including a first generally V-shaped opening having a generally V-shaped cutting surface defined by a pair of recessed, angularly-opposed cutting edges, wherein the V-shaped opening is adapted to engage an edge portion of a shellfish shell and the angularly-opposed cutting edges are disposed at a first acute angle relative to each other, wherein a bisector of the first acute angle extends in a substantially perpendicular direction relative to the body member longitudinal axis, and wherein the first end member includes a convex, bulbous end surface that extends outwardly beyond the body member for pushing shellfish meat along an opened section of a shellfish shell.

2. A shellfish tool in accordance with claim 1, wherein the cutting edges are recessed within the end member and terminate at points spaced inwardly of the first V-shaped opening.

3. A shellfish tool in accordance with claim 1, wherein the termination points of the cutting edges are from about 3 mm to about 10 mm inward of an outer end of the first V-shaped opening.

4. A shellfish tool in accordance with claim 1, wherein the first acute angle between the cutting edges is from about 8° to about 40'.

5. A shellfish tool in accordance with claim 1, wherein the cutting edges of the first V-shaped opening define a continuous V-shaped cutting surface having a cutting edge included angle of from about 8° to about 40°.

6. A shellfish tool in accordance with claim 1, wherein the bulbous end of the first end member is defined by a substantially circular arc.

7. A shellfish tool in accordance with claim 1, wherein the bulbous end of the first end member is defined by a substantially parabolic arc.

8. A shellfish tool in accordance with claim 1, including a second hook-shaped end member carried at an end of the body member opposite from the first end member and including a second V-shaped opening having a generally V-shaped cutting surface defined by a pair of angularly-opposed second cutting edges.

9. A shellfish tool in accordance with claim 8, wherein the second cutting edges are recessed within the end member and terminate at points spaced inwardly of the second V-shaped opening.

10. A shellfish tool in accordance with claim 8, wherein the termination points of the second cutting edges are from about 3 mm to about 10 mm inward of an outer end of the second V-shaped opening.

11. A shellfish tool in accordance with claim 8, wherein the acute angle between the second cutting edges is from about 9° to about 49°.

12. A shellfish tool in accordance with claim 8, wherein the second cutting edges define a continuous V-shaped cutting surface having a cutting edge included angle of from about 7° to about 37°.

13. A shellfish tool in accordance with claim 8, wherein the second end member includes a convex, bulbous end surface that extends outwardly beyond the body member for pushing shellfish meat along an opened section of a shellfish shell.

14. A shellfish tool in accordance with claim 13, wherein the bulbous end of the second end member is defined by a substantially circular arc.

15. A shellfish tool in accordance with claim 13, wherein the bulbous end of the second end member is a substantially parabolic arc.

16. A shellfish tool in accordance with claim 13, wherein the second bulbous end has a larger radius of curvature then the first bulbous end.

17. A shellfish tool in accordance with claim 8, wherein the second end member includes at least one inwardly-extending cracking nib carried between an end of a second cutting edge and an outer edge surface of the second end member.

18. A shellfish tool in accordance with claim 17 wherein the cracking nib has a blunt leading edge and includes tapering outer edges that define therebetween an included angle of from about 10° to about 50°.

19. A shellfish tool in accordance with claim 17, including a pair of opposed cracking nibs.

20. A shellfish tool in accordance with claim 8, wherein the body member includes a thumb-receiving recess adjacent the first end member.

21. A shellfish tool in accordance with claim 20, including a second thumb receiving recess adjacent the second end member.

* * * * *